(12) United States Patent
Li

(10) Patent No.: US 10,124,697 B2
(45) Date of Patent: Nov. 13, 2018

(54) HYBRID VEHICLE WITH A FUEL PRESSURE PROTECTION MODE

(71) Applicants: ZHEJIANG GEELY HOLDING GROUP CO., LTD, Hangzhou (CN); ZHEJIANG GEELY AUTOMOBILE RESEARCH INSTITUTE CO., LTD, Taizhou (CN)

(72) Inventor: Shufu Li, Hangzhou (CN)

(73) Assignees: ZHEJIANG GEELY HOLDING GROUP CO., LTD, Hangzhou (CN); ZHEJIANG GEELY AUTOMOBILE RESEARCH INSTITUTE CO., LTD, Taizhou (CN)

( * ) Notice: Subject to any disclaimer, the term of this patent is extended or adjusted under 35 U.S.C. 154(b) by 0 days.

(21) Appl. No.: 15/312,114

(22) PCT Filed: Mar. 5, 2015

(86) PCT No.: PCT/CN2015/073715
§ 371 (c)(1),
(2) Date: Nov. 17, 2016

(87) PCT Pub. No.: WO2015/176571
PCT Pub. Date: Nov. 26, 2015

(65) Prior Publication Data
US 2017/0088011 A1 Mar. 30, 2017

(30) Foreign Application Priority Data
May 20, 2014 (CN) .......................... 2014 1 0213670

(51) Int. Cl.
*B60L 11/18* (2006.01)
*B60K 6/32* (2007.10)
(Continued)

(52) U.S. Cl.
CPC ............ *B60L 11/1887* (2013.01); *B60K 6/28* (2013.01); *B60K 6/32* (2013.01); *B60K 6/46* (2013.01);
(Continued)

(58) Field of Classification Search
None
See application file for complete search history.

(56) References Cited

U.S. PATENT DOCUMENTS 9,255,664 B2 * 2/2016 Gerstler .................... F17C 9/04
2004/0211192 A1 * 10/2004 Lechner .................. F02B 43/00
62/53.2

(Continued)

FOREIGN PATENT DOCUMENTS

CN 2661475 Y 12/2004
CN 102598380 A 7/2012
(Continued)

OTHER PUBLICATIONS

Yoshino, Machine translation of JP-2007018851-A, Jan. 2007, espacenet.com.*
(Continued)

*Primary Examiner* — David P. Merlino
(74) *Attorney, Agent, or Firm* — Alston & Bird LLP

(57) ABSTRACT

The present invention provides a hybrid vehicle, including a power battery, a fuel storage tank, an electrical power generation unit, a pressure detection unit and a work mode controller, and adopts a pressure protection mode under the work mode controller, wherein the work mode controller is configured to control the vehicle to enter the pressure protection mode when the electrical power generation unit is in a stop state and when the gas pressure detected by the pressure detection unit is higher than a pressure threshold; and in the pressure protection mode, the electrical power
(Continued)

generation unit is started from the stop state to enter the working state to consume the fuel in the fuel storage tank, and the gas pressure in the fuel storage tank is accordingly reduced. As the pressure protection mode is adopted in the present invention, the electrical power generation unit can be automatically started according to the gas pressure of the fuel in the fuel storage tank to charge the power battery using the expanded redundant fuel. The safety problem and the waste resulting from the fact that the expanded fuel exceeding the threshold in the fuel storage tank is discharged into the atmosphere in the prior art are avoided.

9 Claims, 1 Drawing Sheet

(51) Int. Cl.
| | | |
|---|---|---|
| H01M 8/04 | (2016.01) | |
| B60W 20/13 | (2016.01) | |
| B60K 6/28 | (2007.10) | |
| B60K 6/46 | (2007.10) | |
| B60W 10/02 | (2006.01) | |
| B60W 10/08 | (2006.01) | |
| B60W 10/26 | (2006.01) | |
| B60W 10/28 | (2006.01) | |
| H01M 10/42 | (2006.01) | |
| H01M 10/44 | (2006.01) | |
| B60W 50/00 | (2006.01) | |
| B60W 50/08 | (2012.01) | |
| B60K 15/07 | (2006.01) | |
| B60W 10/06 | (2006.01) | |
| B60W 20/18 | (2016.01) | |

(52) U.S. Cl.
CPC ............. *B60K 15/07* (2013.01); *B60L 11/18* (2013.01); *B60L 11/1861* (2013.01); *B60W 10/02* (2013.01); *B60W 10/06* (2013.01); *B60W 10/08* (2013.01); *B60W 10/26* (2013.01); *B60W 10/28* (2013.01); *B60W 20/13* (2016.01); *B60W 50/0098* (2013.01); *B60W 50/082* (2013.01); *H01M 8/04* (2013.01); *H01M 10/425* (2013.01); *H01M 10/445* (2013.01); *B60W 20/18* (2016.01); *B60W 2510/244* (2013.01); *B60W 2510/28* (2013.01); *B60W 2560/00* (2013.01); *B60Y 2200/92* (2013.01); *B60Y 2300/91* (2013.01); *B60Y 2400/112* (2013.01); *B60Y 2400/306* (2013.01); *H01M 2010/4271* (2013.01); *H01M 2220/20* (2013.01); *Y02T 10/6217* (2013.01); *Y02T 10/6286* (2013.01); *Y02T 90/34* (2013.01); *Y10S 903/908* (2013.01); *Y10S 903/93* (2013.01)

(56) References Cited

U.S. PATENT DOCUMENTS

| | | | |
|---|---|---|---|
| 2005/0126837 A1 | 6/2005 | Taxon | |
| 2006/0250902 A1* | 11/2006 | Bender | B60L 11/1842 369/1 |
| 2009/0176135 A1* | 7/2009 | Saito | B60L 11/1881 429/422 |
| 2010/0151343 A1 | 6/2010 | Katano et al. | |
| 2010/0316921 A1 | 12/2010 | Yoshida et al. | |
| 2012/0107709 A1 | 5/2012 | Mori et al. | |
| 2013/0302658 A1* | 11/2013 | Soga | B60L 11/1861 429/62 |
| 2014/0033946 A1* | 2/2014 | Billig | B61O 5/00 105/35 |
| 2014/0114512 A1* | 4/2014 | Treharne | B60W 10/06 701/22 |

FOREIGN PATENT DOCUMENTS

| | | |
|---|---|---|
| CN | 103342098 A | 10/2013 |
| CN | 104002657 A | 8/2014 |
| DE | 10 2007 031347 | 1/2009 |
| FR | 2 991 275 | 12/2013 |
| JP | 2003-308868 A | 10/2003 |
| JP | 2007-018851 A | 1/2007 |
| JP | 2007018851 A * | 1/2007 |
| JP | 2009 044953 A | 2/2009 |
| JP | 2012/246880 | 12/2012 |
| KR | 20110120667 A * | 11/2011 |
| WO | WO 2007 013667 A1 | 2/2007 |
| WO | WO 2009 057616 A1 | 5/2009 |

OTHER PUBLICATIONS

Lim, Machine translation of KR-20110120667-A, Nov. 2011, IP.com.*
International Search Report and Written Opinion for International Application No. PCT/CN2015/073715 dated May 29, 2015.
Office Action for Chinese Application No. 201410213670.1 dated May 19, 2016.
Notification of Grant Patent Right for Invention for Chinese Application No. 201410213670.1 dated Nov. 7, 2016.
Office Action for European Application No. 15795564.2 dated Feb. 8, 2018, 4 pages.
Extended European Search Report for corresponding European Application No. 15795564.2 dated Apr. 12, 2017, 8 pages.
English Translation for Written Opinion for International Application No. PCT/CN2015/073715 dated May 29, 2015, 8 pages.

* cited by examiner

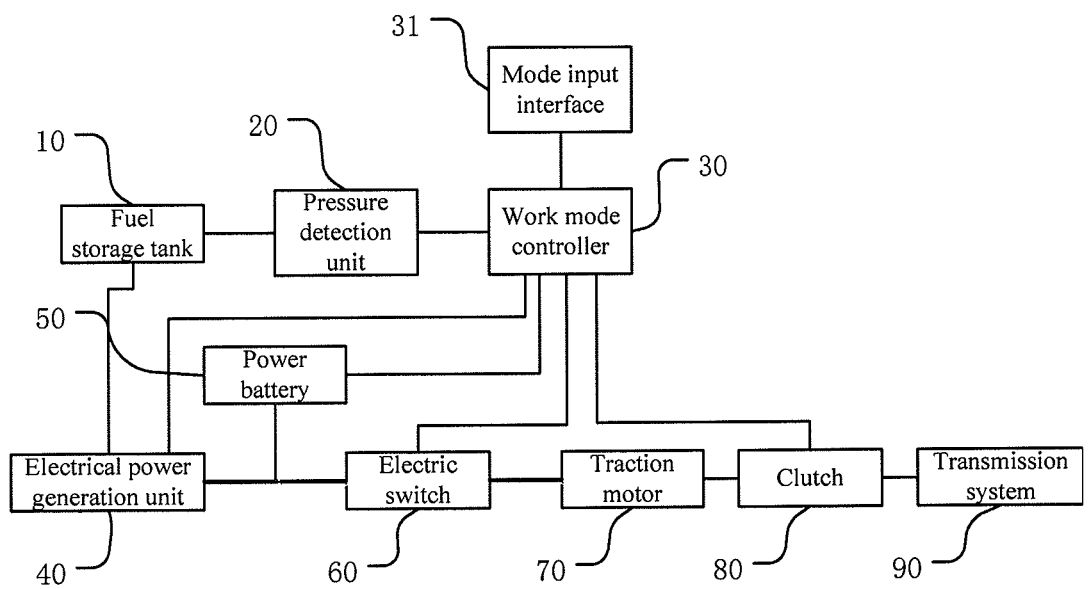

HYBRID VEHICLE WITH A FUEL PRESSURE PROTECTION MODE

FIELD OF THE INVENTION

The present invention relates to the field of hybrid vehicles, and in particular, to a hybrid vehicle at least including electric drive.

BACKGROUND OF THE INVENTION

Since 1990s, global energy crisis and environmental pollution have become more and more serious. Fossil oil accounts for more than 40% in the global total energy consumption, and according to the current proved reserves and consumption rate estimates, oil resources on the earth may be used up in the next few decades.

Motor vehicles are the major consumers of the oil and the major producers of air pollution. $CO_2$ in the exhausts of the motor vehicles is one of the main sources of the greenhouse effect on the earth, and other components in the exhausts are also significant urban air pollutants.

Years of practice has proved that the use of novel fuels and novel power systems is an important way of solving the problem of vehicle energy bottlenecks and exhausts pollution. With respect to the novel fuels, the practice has proved that the use of alternative fuels, which are cleaner than gasoline and diesel, is a feasible solution to solve the problem of energy crisis and emission pollution. With respect to the novel power systems, pure electric vehicles using plumbic acid, nickel-hydrogen or lithium power storage batteries have the advantages of zero emission, low noise and high efficiency. However, due to the limitation of the electric energy storage technology, the pure electric vehicles not only have high manufacturing costs, but also have small cruising ranges and long charging time, and thus cannot really meet the use demands of people at present and in a relatively long future period and do not have enough market competitiveness. Therefore, a hybrid vehicle is used as a transitional vehicle between the traditional vehicle and the pure electric vehicle at present, the hybrid vehicle has some advantages of the both, such as ultra low emission, high efficiency and long cruising range, and only the cost is slightly higher than the vehicles that adopt traditional power systems. The power system of the hybrid vehicle includes a plurality of types, such as series, parallel and series-parallel types.

In the hybrid vehicle using the novel fuel in combination with electric power, as the novel fuel is generally stored in a corresponding fuel storage tank in a compression or a cooling compression manner. When the temperature in the external environment rises or when the vehicle is used not for a long time, the pressure of fuel in the fuel storage tank is liable to rise above a safe pressure thereof, for example, at the connection the fuel storage tank to the outside heat is liable to be absorbed and results in an increased pressure of the fuel in the fuel storage tank. This correspondingly brings a safety problem. At this time, to avoid the problem of the fuel storage tank, a pressure release valve is usually arranged at the fuel storage tank, which automatically opens when the pressure of the fuels in the fuel storage tank exceeds a certain threshold and releases a part of fuel into the surrounding atmosphere. Although the safety of the fuel storage tank is guaranteed in this way from a certain perspective, the combustible gas fuel leaked into the surrounding atmosphere will bring new potential safety problems, and it is also a waste of energy.

SUMMARY OF THE INVENTION

An object of the present invention is to improve the safety of a hybrid vehicle with a fuel storage tank. Another object of the present invention is to improve the fuel utilization rate of the hybrid vehicle with the fuel storage tank. Yet another object of the present invention is to safely control or release the fuel pressure of the fuel storage tank of the hybrid vehicle.

Particularly, the present invention provides a hybrid vehicle, including:
  a power battery, which can be selectively brought into a charging state and a discharging state, wherein the power battery stores electric energy in the charging state and provides the electric energy for driving the vehicle in the discharging state;
  a fuel storage tank, used for storing a fuel therein, wherein the fuel stored in the fuel storage tank generates a gas pressure in the fuel storage tank;
  an electrical power generation unit having a working state and a stop state, wherein in the working state, the electrical power generation unit converts the chemical energy of the fuel in the fuel storage tank into the electric energy for output;
  a pressure detection unit, used for detecting the gas pressure in the fuel storage tank; and
  a work mode controller, used for controlling the vehicle to work selectively in one of a plurality of work modes, wherein the plurality of work modes include a pressure protection mode;
  wherein the work mode controller is configured to control the vehicle to enter the pressure protection mode, in the case the electrical power generation unit is in the stop state, when the gas pressure detected by the pressure detection unit is higher than a pressure threshold; and under the pressure protection mode, the electrical power generation unit is started from the stop state to enter the working state to use the fuel in the fuel storage tank, and the gas pressure in the fuel storage tank is accordingly reduced.

Further, under the pressure protection mode, the power battery is in the charging state, thereby receiving the electric energy from the electrical power generation unit and being charged.

Further, the plurality of work modes further include a battery-only power supply mode performed in the case the vehicle is started, wherein under the battery-only power supply mode, the electrical power generation unit is constantly in the stop state, and the power battery is constantly in the discharging state to consume the electric energy stored in the power battery to drive the vehicle.

Further, the plurality of work modes further include a conventional mode performed in the case the vehicle is started, wherein in the conventional mode, the electrical power generation unit is selectively in the working state or the stop state according to a predetermined working strategy, and the power battery is selectively in the charging state or the discharging state according to the predetermined working strategy.

Further, the hybrid vehicle further includes a mode input interface, used for receiving a mode selection instruction that is input by a user and indicates that the battery-only power supply mode is selected, wherein the work mode controller controls the vehicle to work in the battery-only power supply mode according to the mode selection instruction.

Further, the work mode controller is configured to prohibit the vehicle from entering the battery-only power supply mode or make the vehicle leave from the battery-only power supply mode, when the electricity quantity of the power battery is lower than an electricity quantity threshold.

Further, under the conventional mode, when the power battery is in the charging state, the charging capacity of the power battery is limited to be lower than a maximum chargeable capacity of the power battery.

Further, the work mode controller is configured to be able to make the vehicle enter the pressure protection mode when the vehicle is in a started state or a shutdown state; or the work mode controller is configured to be able to make the vehicle enter the pressure protection mode only when the vehicle is in the shutdown state.

Further, the hybrid vehicle further includes:
an electric switch, used for turning on or off an electric energy path to a traction motor of the vehicle, wherein the work mode controller is configured to open the electric switch when the vehicle enters the pressure protection mode from the shutdown state; and/or
a clutch, used for turning on or off a mechanical power path to wheels of the vehicle, wherein the work mode controller is configured to disengage the clutch when the vehicle enters the pressure protection mode from the shutdown state.

Further, the hybrid vehicle of the present invention is a series hybrid vehicle.

As the hybrid vehicle of the present invention has the pressure protection mode, when the gas pressure of the fuel in the fuel storage tank exceeds the pressure threshold, the electrical power generation unit is automatically started to convert the chemical energy of expanded redundant fuel in the fuel storage tank into the electric energy. This facilitates utilization or consumption of the converted electric energy thereafter. Compared with the way of discharging the fuel in the fuel storage tank into the atmosphere to release the pressure in the prior art, the way of utilizing or consuming the redundant fuel in the fuel storage tank in the form of the electric energy according to the present invention is safer. Particularly, under proper circumstances, the chemical energy of the redundant fuel can be converted into the electric energy for charging the power battery of the vehicle, which avoids the waste of the fuel while improving the safety, and improves the utilization rate of the fuel.

According to the following detailed description of specific embodiments of the present invention in conjunction with drawings, the aforementioned and other objects, advantages and features of the present invention will be more apparent to those skilled in the art.

BRIEF DESCRIPTION OF THE DRAWINGS

Some specific embodiments of the present invention will be described below in detail in an exemplary, rather than a restrictive manner with reference to the drawings. Identical reference signs in the drawings represent identical or similar components or parts. Those skilled in the art should understand that these drawings are not necessarily drawn to scale. In the drawings:

FIG. 1 is a schematic diagram of a structure of a power system of a series hybrid vehicle according to one embodiment of the present invention.

DETAILED DESCRIPTION OF THE EMBODIMENTS

FIG. 1 shows a schematic diagram of a power system of a series hybrid vehicle according to one embodiment of the present invention. The vehicle may include a power battery 50, a fuel storage tank 10, an electrical power generation unit 40, a pressure detection unit 20 and a work mode controller 30.

The power battery 50 may be selectively in a charging state and a discharging state, and may store electric energy in the charging state and provide electric energy for driving the vehicle in the discharging state. The fuel storage tank 10 may store fuel therein. Particularly, when the fuel is natural gas, compressed natural gas or dimethyl ether or the like, which is gaseous at a normal temperature, or volatile methanol or ethanol or the like, an obvious gas pressure may be generated in the fuel storage tank 10 by the fuel stored therein, and the gas pressure will be greatly increased with the increasing of the external ambient temperature. The pressure detection unit 20 may be used for detecting the gas pressure in the fuel storage tank 10. The electrical power generation unit 40 may have a working state and a stop state, and in the working state, can convert the chemical energy of the fuel in the fuel storage tank 10 into the electric energy for output. The electrical power generation unit 40 may be a generator set composed of an engine and a generator, wherein the engine consumes the fuel in the fuel storage tank 10 and converts the chemical energy of the fuel into the chemical energy for output, and then the generator may convert the mechanical energy output by the engine into the electric energy for output.

In addition to the various components described above, a traction motor 70 and a transmission system 90 of the vehicle are further exemplarily shown in the embodiment as shown in FIG. 1. When the power system of the series hybrid vehicle as shown in FIG. 1 is working, the electrical power generation unit 40 and/or the power battery 50 provides the electric energy to the traction motor 70 and thus drive the traction motor 70. When working, the traction motor 70 may convert the electric energy into the mechanical energy and transfer the mechanical energy to the transmission system 50 of the vehicle, so as to drive the vehicle.

The work mode controller 30 may control the vehicle to work selectively under one of a plurality of work modes. In one embodiment, the plurality of work modes can include a conventional mode, a pressure protection mode and a battery-only power supply mode.

Conventional Mode

The conventional mode may be a main work mode in a started or operating state of the vehicle, and may adopt a common work mode of the existing hybrid vehicle. Under the conventional mode, the electrical power generation unit 40 may be selectively in the working state or the stop state according to a predetermined working strategy, and the power battery 50 may be selectively in the charging state or the discharging state according to the predetermined working strategy. The states of the electrical power generation unit 40 and the power battery 50 may be automatically adjusted under the conventional mode according to the change of the actual operation conditions of the vehicle. For example, when the electricity quantity of the power battery 50 is sufficient, the power battery 50 may provide the electric energy alone to the traction motor 70 of the vehicle, so that the traction motor generates a mechanical driving force to drive the vehicle to travel, and at this time, the electrical power generation unit 40 may be in the stop state. Also for example, when the electric energy of the power battery 50 is insufficient, the electrical power generation unit 40 will be started or launched and charge the power battery 50. Yet for example, when the vehicle needs a larger driving power, both the electrical power generation unit 40 and the power battery 50 provide the electric energy to the traction motor 70 simultaneously. Generally, for a vehicle operating under the conventional mode, the engine in the electrical power generation unit 40 and the power battery 50 will both operate in optimal states, which is an advantage the hybrid vehicle itself has.

Pressure Protection Mode

In the case the electrical power generation unit 40 is in the stop state, when the gas pressure detected by the pressure detection unit 20 is higher than a pressure threshold, the work mode controller 30 controls the vehicle to enter the pressure protection mode. When the gas pressure in the fuel storage tank 10 is higher than the pressure threshold, it indicates that the fuel storage tank 10 is in an unsafe state. In the pressure protection mode, the electrical power generation unit 40 is launched from the stop state to enter the working state to use the fuel in the fuel storage tank 10, and thus the gas pressure in the fuel storage tank 10 is accordingly reduced and returns to be at least lower than the pressure threshold.

According to the present invention, the pressure protection mode is additionally provided for the vehicle, so that after the gas pressure in the fuel storage tank 10 exceeds the pressure threshold, the fuel may not be discharged into the atmosphere, but be used for driving the electrical power generation unit 40 of the vehicle to generate electric power, thereby reducing or consuming the expanded fuel in the fuel storage tank 10, and thus the gas pressure in the fuel storage tank 10 returns to a safe range. The electric energy output by the electrical power generation unit 40 may be consumed in different ways, for example, for driving the traction motor 70 of the vehicle, or for charging the power battery 50, or for being applied to other electric appliances of the vehicle, such as an air conditioner and the like. In other embodiments, a device special for consuming electricity may even be additionally arranged in the vehicle, such as an electrically driven idling flywheel or the like, so as to consume the electric energy generated by the electrical power generation unit 40 when the vehicle enters the pressure protection mode. According to the present invention, the unsafety and energy waste resulting from directly discharging the fuel to the atmosphere when the pressure in the fuel storage tank 10 rises are avoided in this way.

The vehicle may enter the pressure protection mode when in a started state, or the vehicle may enter the pressure protection mode when in a shutdown state. When the vehicle is in the shutdown state, and particularly when the vehicle has not been used for a long time, the fuel in the fuel storage tank 10 will generate an ultrahigh gas pressure in such conditions as high temperature. Even if the vehicle is in the started state, when the vehicle is driven only by the power battery 50 for a long time, and the fuel in the fuel storage tank is not consumed by the electrical power generation unit 40, the fuel in the fuel storage tank will generate the ultrahigh gas pressure in such conditions as high temperature and vibration. Therefore, the pressure protection mode of the present invention may be automatically started when the gas pressure exceeds the threshold in any of the aforementioned two cases. Certainly, it may be understood that, even under the conventional mode, the vehicle in the started state may also automatically carry out optimization control on the utilization mode of the electric energy by its control system, and the fuel in the fuel storage tank 10 is used at a certain time interval, which can avoid the phenomenon of an over high gas pressure in the fuel storage tank 10. Accordingly, the possibility that the gas pressure of the fuel in the fuel storage tank 10 exceeds the pressure threshold in the started state of the vehicle is much smaller than that in the shutdown state of the vehicle. Therefore, in another embodiment, the work mode controller 30 may be configured to be able to start the pressure protection mode only in the shutdown state of the vehicle. In the present invention, the operation of entering the pressure protection mode of the vehicle when in the started state or in the shutdown state may be completely and automatically operated by the work mode controller 30 according to the gas pressure in the fuel storage tank 10 detected by the pressure detection unit 20 without any intervention of a driver.

Particularly, in the started state of the vehicle, the pressure protection mode may have a higher execution priority than the conventional mode, so that the vehicle may enter the pressure protection mode timely when the pressure of the fuel in the fuel storage tank 10 is higher than the pressure threshold. When the gas pressure in the fuel storage tank 10 detected by the pressure detection unit 20 returns to the safe range, the work mode controller 30 of the vehicle may enable the vehicle to return to the conventional mode from the pressure protection mode.

In addition, in order that the vehicle may enter the pressure protection mode in the shutdown state, it is preferable that the work mode controller 30 and the pressure detection unit 20 of the vehicle are powered up and in a working state at any time (particularly when in the shutdown state of the vehicle), so as to respond to any possible change of the gas pressure in the fuel storage tank 10 at any time.

Under the pressure protection mode, although the electric energy generated by the electrical power generation unit 40 may be consumed by various means as mentioned above, the charging of the power battery 50 is preferred in order to save energy and improve the utilization rate of the fuel, and thus the utilization of the electric energy may be improved to the uttermost.

Battery-Only Power Supply Mode

As mentioned above, under the pressure protection mode, the electric energy generated by the electrical power generation unit 40 is preferably used for charging the power battery 50. However, it may be understood that the power battery 50 is not certainly in a chargeable condition at this moment. For example, after the shutdown of the vehicle, the electric energy in the power battery 50 might be still in a full state or a relatively sufficient state. In this case, the power battery 50 might be unable to accommodate or cannot adequately accommodate the electric energy output by the electrical power generation unit 40. To this end, the present invention may further provide a battery-only power supply mode.

The battery-only power supply mode is a work mode aimed at consuming the electric energy in the power battery 50 in the started state of the vehicle. Under the battery-only power supply mode, the electrical power generation unit 40 may be constantly in the stop state, and the power battery 50 is constantly in the discharging state to consume the electric energy stored in the power battery 50 to drive the vehicle.

Herein, the "constantly" means that the electrical power generation unit 40 will not supplement the electricity quantity of the power battery 50 during the power battery 50 constantly outputs the electric energy, so that the electricity quantity state of the power battery 50 is suitable to fully accommodate the electric energy generated by the electrical power generation unit 40 under the pressure protection mode during the gas pressure of the fuel storage tank 10 returns to the safe range after exceeding the pressure threshold. For example, the electricity quantity of the power battery 50 may be finally reduced to 30% of the total charging capacity by adopting the battery-only power supply mode.

It should be understood that, under the conventional mode of the vehicle, during a period of time, the electrical power generation unit 40 may also be constantly in the stop state, and the power battery 50 is constantly in the discharging state. However, the battery-only power supply mode herein is aimed at reducing the electricity quantity in the power battery 50, and is different from the conventional mode which is aimed at enabling the power battery 50 to work in the optimal state.

The work mode controller 30 may control the vehicle to enter the battery-only power supply mode according to a mode selection instruction provided by the user, for example, the driver. As shown in FIG. 1, the vehicle may further include a mode input interface 31, and the user may input the mode selection instruction to the work mode controller 30 by means of the mode input interface 31. The battery-only power supply mode may have a higher execution priority than the conventional mode. In this way, when receiving the mode selection instruction that is input by the user and indicates that the battery-only power supply mode is selected, the work mode controller 30 can switch the vehicle from the conventional mode to the battery-only power supply mode. The mode input interface 31 may be a switch or a button, which is independently provided for the battery-only power supply mode and is only used for compulsively controlling the current vehicle to operate in the battery-only power supply mode. Due to the arrangement of the mode input interface 31, the user, for example, the driver may compulsively discharge the power battery 50, which is yet in a sufficient electricity quantity state, according to whether the vehicle is about to enter a long-term shutdown state. For example, during driving the vehicle, if the driver expects that the vehicle will not be used for a long time, when there is still a certain distance away from the parking destination, the driver may actively force the vehicle to work under the battery-only power supply mode by operating the mode input interface 31, so that the electricity quantity in the power battery 50 will be in a relatively low state after the shutdown of the vehicle, thereby ensuring that there will be an enough space to accommodate the electric energy output by the electrical power generation unit 40 under the pressure protection mode to be possibly entered thereafter. In other embodiments, the mode input interface 31 may further be used for receiving a mode selection instruction that is input by the user and indicates that other work modes are selected. For example, when the vehicle is under the battery-only power supply mode, if the driver actively expects to switch back to the conventional mode, the driver may input the mode selection instruction that indicates that the conventional mode is selected via the mode input interface 31.

In the battery-only power supply mode, to avoid excessive discharge of the power battery 50, the work mode controller 30 may further be configured to prohibit the vehicle from entering the battery-only power supply mode or have the vehicle leave from the battery-only power supply mode when the electricity quantity of the power battery 50 is lower than an electricity quantity threshold. One of the objects of the present invention is to avoid the waste of the fuel and fully utilize the electric power generated by this part of energy, the requirements of the present invention have been satisfied when the power battery is in this low electricity quantity state, so there is no need to enter the battery-only power supply mode. In this way, when the vehicle operates under the battery-only power supply mode, once the electricity quantity in the power battery 50 drops to lower than the preset electricity quantity threshold, even if the vehicle does not arrive at the preset parking destination of the driver, the work mode controller 30 will automatically terminate the battery-only power supply mode to protect the power battery 50.

Although the vehicle may have all the foregoing three work modes in the aforementioned embodiments, the battery-only power supply mode may be omitted for the vehicle in other embodiments. In this way, in the pressure protection mode, the power battery 50 may be charged in the case the charging conditions are satisfied, and the electric energy output by the electrical power generation unit 40 is consumed in other way described above in the case that the charging conditions are not satisfied or the power battery has been fully charged. Alternatively, the electric energy output by the electrical power generation unit 40 may be directly consumed in other ways. In addition, it should also be understood that, although the conventional mode is listed above, it is obvious that the present invention may not involve the improvement to the conventional mode in the foregoing embodiments. In other embodiments, some improvements may be carried out on the conventional mode in view of the object of the present invention. For example, under the conventional mode, when the power battery 50 is in the charging state, the charging capacity of the power battery 50 may be limited to be lower than the maximum chargeable capacity of the power battery 50, for example, to be limited to 80% of the maximum chargeable capacity. By means of leaving a charging room at any time, an electricity quantity space may be reserved for the pressure protection mode that might happen at any time in order to accommodate the electric energy output by the electrical power generation unit 40.

As shown in FIG. 1, the vehicle may further include an electric switch 60 for turning on or off an electric energy path to a traction motor 70 of the vehicle. The work mode controller 30 may be configured to open the electric switch 60 when the vehicle enters the pressure protection mode from the shutdown state. The electric switch 60 may be provided in an electric power line for supplying electric power from the power battery 50 and the electrical power generation unit 40 to the traction motor 70. In this way, when the vehicle enters the pressure protection mode from the shutdown state, by opening the electric switch 60, the electric energy output by the electrical power generation unit 40 will be used only for charging the power battery 50 of the vehicle or consumed by other electric appliances, rather than be transferred to the traction motor 70 of the vehicle, thereby avoiding the working of the traction motor 70 of the vehicle to waste the electric energy. Meanwhile, this makes the pressure protection mode only used as an independent procedure of consuming the fuel in the fuel storage tank 10 and thus driving the electrical power generation unit 40, so as to avoid a possible bug that the vehicle can be started by the pressure protection mode without using a vehicle ignition key. When the vehicle is started, the current state of the electric switch 60 may be detected by the work mode controller 30, in order to guarantee that the electric switch 60 is in a closed state and that the electric power line to the traction motor 70 is normally connected. In addition, in the started state of the vehicle, even if the pressure protection mode is started, the electric switch 60 will be in the closed state under the control of the work mode controller 30.

As shown in FIG. 1, the vehicle may further include a clutch 80, which is used for turning on or off a mechanical power path to wheels of the vehicle. The work mode controller 30 may be configured to disengage the clutch 80 when the vehicle enters the pressure protection mode from the shutdown state. The clutch 80 may be the clutch the vehicle originally has in a vehicle transmission, or may be a clutch additionally provided for this purpose. By operating the clutch 80, it may achieve the effect that when the vehicle enters the pressure protection mode from the shutdown state, even if the traction motor 70 works, the vehicle cannot be driven.

The work mode controller 30 may be embodied by the power control system of the hybrid vehicle, or may be a part of the power control system, or may be independent from the original power control system of the vehicle. In an exemplary working process, under the shutdown or started state of the vehicle, the pressure detection unit 20 may send a signal to the work mode controller 30 when detecting that the gas pressure of the fuel in the fuel storage tank 10 exceeds the predetermined pressure threshold, and the work mode controller 30 will start the pressure protection mode after receiving the signal. Alternatively, the work mode controller 30 constantly reads the pressure value detected by the pressure detection unit 20 and compares the pressure value with the predetermined pressure threshold stored therein, and starts the pressure protection mode when the detected pressure value is higher than the pressure threshold. For starting the pressure protection mode, the work mode controller 30 sends a start signal to the electrical power generation unit 40 to make the electrical power generation unit work to use the fuel in the fuel storage tank 10, so as to reduce the gas pressure thereof; meanwhile, the work mode controller 30 further sends a charging signal to the power battery 50 (specifically, usually a battery management system of the power battery 50), so that the power battery 50 enters the charging state, and the electric energy generated by the working electrical power generation unit 40 can be used for directly charging the power battery 50. In addition, if the vehicle is in the shutdown state at this moment, the work mode controller 30 may further send a control signal to the electric switch 60 and/or the clutch 80 at the same time or in advance, in order to cut off the electric power supply path to the traction motor 70 of the vehicle and/or the mechanical transmission path to the transmission system 80.

In another exemplary working process, under the started state of the vehicle, when the vehicle is operated in the conventional mode at present, the driver sends the mode selection instruction to the work mode controller 30 via the mode input interface 31, thereby indicating that the battery-only power supply mode is selected. The work mode controller 30 firstly obtains the current charge state of the power battery 50 from the battery management system thereof, and compares the current electricity quantity of the power battery 50 with a predetermined electricity quantity threshold stored in the work mode controller 30. If the current electricity quantity of the power battery 50 is lower than the electricity quantity threshold, the work mode controller 30 does not change the current work states of the electrical power generation unit 40 and the power battery 50, namely the vehicle is prohibited from entering the battery-only power supply mode. If the current electricity quantity of the power battery 50 is higher than the electricity quantity threshold, the work mode controller 30 sends a control signal to the electrical power generation unit 40 to force the electrical power generation unit to keep or enter the stop state, and sends a control signal to the power battery 50 to force the power battery to keep or enter the discharging state, so that the vehicle only uses the power battery 50 as an electric energy output source to provide electric energy for the traction motor 70 of the vehicle to drive the vehicle to advance. During the constant discharging process of the power battery 50, the work mode controller 30 continues to obtain its current charge state, and when the electricity quantity of the power battery 50 is lower than the electricity quantity threshold, the work mode controller 30 controls the vehicle to exit the battery-only power supply mode and controls the electrical power generation unit 40 and the power battery 50 to work under the conventional mode.

In addition, in the present invention, the setting manner of the pressure threshold of the fuel storage tank 10 may adopt one of the two ways:
(1) the pressure threshold is a single pressure value, and once the gas pressure in the fuel storage tank 10 exceeds the pressure value, the pressure protection mode is triggered.
(2) The pressure threshold is a pressure range, which includes a pressure upper limit value and a pressure lower limit value.

In the case the pressure threshold is the pressure range, the pressure in the fuel storage tank 10 being "higher than the pressure threshold" may refer to being higher than the upper limit value of the pressure range, while the pressure in the fuel storage tank 10 "returning to the safe range" may refer to being lower than the lower limit value of the pressure range. In this way, after the pressure protection mode is started because the pressure in the fuel storage tank 10 is higher than the upper limit value, the pressure protection mode will continue at least until the pressure in the fuel storage tank 10 is lower than the lower limit value. Therefore, after the pressure protection mode is terminated at the first time, even if the pressure in the fuel storage tank 10 will continue from the lower limit value to rise to be higher than the upper limit value, and the pressure protection mode needs to be started again, a corresponding time interval is formed between the twice pressure protection modes, thereby avoiding the situation that in the case that the pressure threshold is the single pressure value, the pressure protection mode is frequently started and terminated resulting from a fluctuation up and down of the pressure in the fuel storage tank 10 around the single pressure value.

The vehicle as shown in FIG. 1 is a series hybrid vehicle. The power system of the series hybrid vehicle may adopt the solution disclosed by the Chinese patent application No. 201310467918.2 filed by the applicant, and the entire contents of which is herein incorporated by reference. A power system applied to a series hybrid vehicle provided in the referred patent application includes:

a fuel source (which may correspond to the fuel storage tank 10 of the present application);

a control system (which may correspond to the work mode controller 30 of the present application);

at least two auxiliary power units (which may correspond to the electrical power generation unit 40 of the present application), wherein each auxiliary power unit independently receives the fuel from the fuel source under the control of the control system, converts the chemical energy in the fuel into electric energy, and outputs the electric energy to a common current bus;

a power battery (which may correspond to the power battery 50 of the present application), electrically connected to the common current bus to receive the electric energy from the common current bus under the control of the control system to be charged or discharge through the common current bus; and a traction motor (which may correspond to the traction motor 70 of the present application), electrically connected to the common current bus to receive the electric energy from the common current bus under the control of the control system, convert the electric energy into mechanical energy and transfer the mechanical energy to a power train (which may correspond to the transmission system 90 of the present application) of the vehicle to drive the vehicle to operate.

The power system is adapted to allow the use of alternative fuels with lower energy density instead of using traditional gasoline or diesel, and is adapted to allow the engine in the auxiliary power unit to work in a working condition area in which both oil consumption and emission are very low, thereby effectively reducing the emission, improving the economic efficiency of the fuels, and compensating for the problem that the energy conversion efficiency of the power system of the series hybrid electric vehicle is relatively low. Moreover, the power system may be flexibly provided with an appropriate number of engines for combined use according to demands.

Although an exemplary illustration is given above using the series hybrid vehicle as an example, those skilled in the art should understand that hybrid vehicles in other forms, for example, parallel or series-parallel type, can be applicable to the solutions of the present invention, as long as the fuel used thereby has the possibility of generating the over high pressure, and the electrical power generation unit capable of generating power through the chemical energy of the fuel and the power battery having the optional charging and discharging states are provided.

So far, those skilled in the art should be aware that, although a plurality of exemplary embodiments of the present invention have been shown and described herein in detail, many other variations or modifications conforming to the principle of the present invention can still be directly determined or derived according to the contents disclosed in the present invention without departing from the spirit and scope of the present invention. Therefore, the scope of the present invention should be understood and deemed as covering all of these other variations or modifications.

The invention claimed is:

1. A hybrid vehicle, comprising:
a power battery, which can be selectively in a charging state and a discharging state, wherein the power battery stores electric energy in the charging state and provides the electric energy for driving the vehicle in the discharging state;
a fuel storage tank for storing fuel therein, wherein the fuel stored in the fuel storage tank generates a gas pressure in the fuel storage tank;
an electrical power generation unit having a working state and a stop state, wherein in the working state, the electrical power generation unit converts chemical energy of the fuel in the fuel storage tank into electric energy for output;
a pressure detection device for detecting the gas pressure in the fuel storage tank; and a work mode controller for controlling the vehicle to work selectively in one of a plurality of work modes, wherein the plurality of work modes comprise a pressure protection mode; and
an electric switch for turning on or off an electric energy path to a traction motor of the vehicle, wherein the electric switch is provided in an electric power line for supplying electric power from the power battery and the electrical power generation unit to the traction motor;
wherein the work mode controller is configured to control the vehicle to enter the pressure protection mode in the case the electrical power generation unit is in the stop state and when the gas pressure detected by the pressure detection device is higher than a pressure threshold;
wherein under the pressure protection mode, the electrical power generation unit is launched from the stop state to enter the working state to use the fuel in the fuel storage tank to generate electric energy, thereby reducing the gas pressure in the fuel storage tank;
wherein under the pressure protection mode, the power battery is in the charging state, thereby receiving the electric energy from the electrical power generation unit and being charged;
wherein the work mode controller is configured to be able to have the vehicle enter the pressure protection mode when the vehicle is in a shutdown state; and
wherein the work mode controller is configured to open the electric switch when the vehicle enters the pressure protection mode from the shutdown state.

2. The hybrid vehicle of claim 1, wherein the plurality of work modes further comprise a battery-only power supply mode performed in the case the vehicle is started, wherein under the battery-only power supply mode, the electrical power generation unit is constantly in the stop state, and the power battery is constantly in the discharging state to use the electric energy stored in the power battery to drive the vehicle.

3. The hybrid vehicle of claim 2, wherein the plurality of work modes further comprise a conventional mode performed in the case the vehicle is started, and in the conventional mode, the electrical power generation unit is selectively in the working state or the stop state according to a predetermined working strategy, and the power battery is selectively in the charging state or the discharging state according to the predetermined working strategy.

4. The hybrid vehicle of claim 3, wherein under the conventional mode, when the power battery is in the charging state, the charging capacity of the power battery is limited to be lower than a maximum chargeable capacity of the power battery.

5. The hybrid vehicle of claim 2, further comprising a mode input interface for receiving a mode selection instruction that is input by a user and indicates that the battery-only power supply mode is selected;
wherein the work mode controller controls the vehicle to work under the battery-only power supply mode according to the mode selection instruction.

6. The hybrid vehicle of claim 2, wherein the work mode controller is configured to prohibit the vehicle from entering the battery-only power supply mode or to make the vehicle leave from the battery-only power supply mode, when the electric energy of the power battery is lower than an electric energy threshold.

7. The hybrid vehicle of claim 1, wherein the work mode controller is configured to be able to have the vehicle enter the pressure protection mode when the vehicle is in a started state.

8. The hybrid vehicle of claim 1, further comprising:
a clutch for turning on or off a mechanical power path to wheels of the vehicle, wherein the work mode controller is configured to disengage the clutch when the vehicle enters the pressure protection mode from the shutdown state.

9. The hybrid vehicle of claim 1, wherein the vehicle is a series hybrid vehicle.

\* \* \* \* \*